US005956141A

United States Patent [19]
Hayashi

[11] Patent Number: 5,956,141
[45] Date of Patent: Sep. 21, 1999

[54] FOCUS ADJUSTING METHOD AND SHAPE MEASURING DEVICE AND INTERFERENCE MICROSCOPE USING SAID FOCUS ADJUSTING METHOD

[75] Inventor: Shinichi Hayashi, Tokyo, Japan

[73] Assignee: Olympus Optical Co., Ltd., Tokyo, Japan

[21] Appl. No.: 08/929,300

[22] Filed: Sep. 11, 1997

[51] Int. Cl.⁶ ..................................... G01B 9/02
[52] U.S. Cl. ...................... 356/357; 356/359; 356/360
[58] Field of Search .................................. 356/359, 360, 356/357, 358

[56] References Cited

U.S. PATENT DOCUMENTS 5,469,259  11/1995  Golby et al. ............................. 356/351
5,784,164   7/1998  Deck et al. .............................. 356/359

Primary Examiner—Robert H. Kim
Assistant Examiner—Andrew H. Lee
Attorney, Agent, or Firm—Stevens, Davis, Miller & Mosher, L.L.P.

[57] ABSTRACT

Upon adjusting a focus of an imaging optical system 48 which forms an interference image of an object 44 under inspection produced by an interference optical system 43 and containing information about a shape of the object under inspection onto a given image forming plane at which an image sensing device 49 is arranged, the focus of the imaging optical system 48 with respect to the object 44 under inspection is adjusted by using a singular point obtained from said interference image formed on said image forming plane. Then, the focus of the imaging optical system 48 can be accurately adjusted to a position at which a shape of the object 44 under inspection can be measured precisely with a high reproducibility.

16 Claims, 11 Drawing Sheets

FIG_3
PRIOR ART

FIG_5A
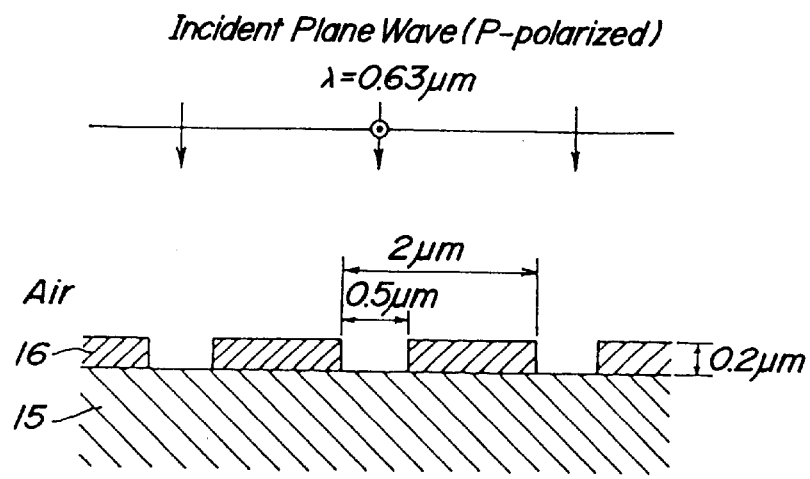
FIG_5B
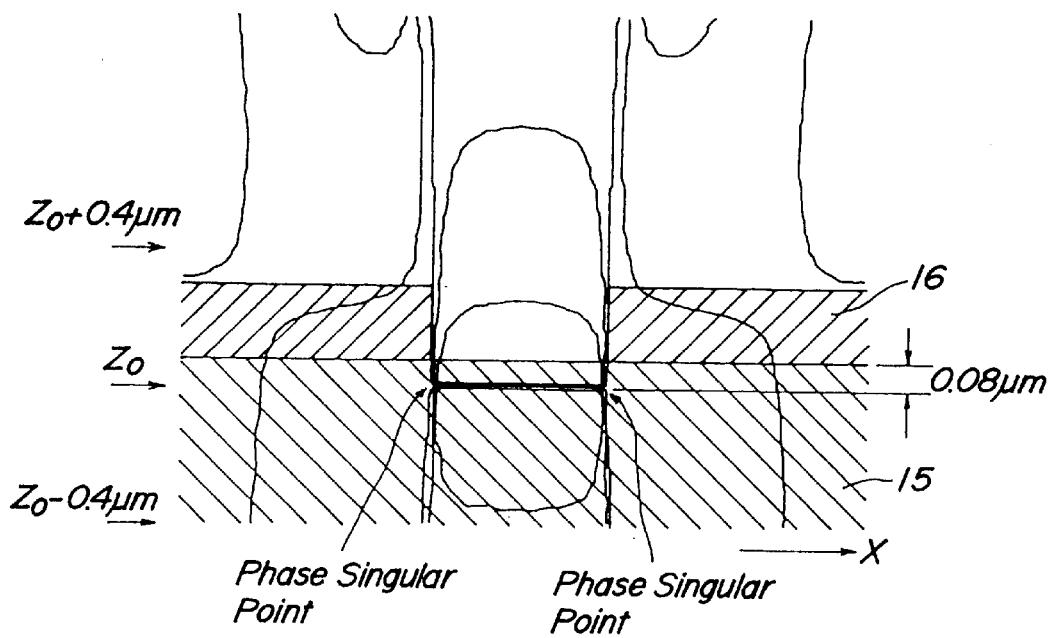

FIG_7

FIG_8

FIG_9

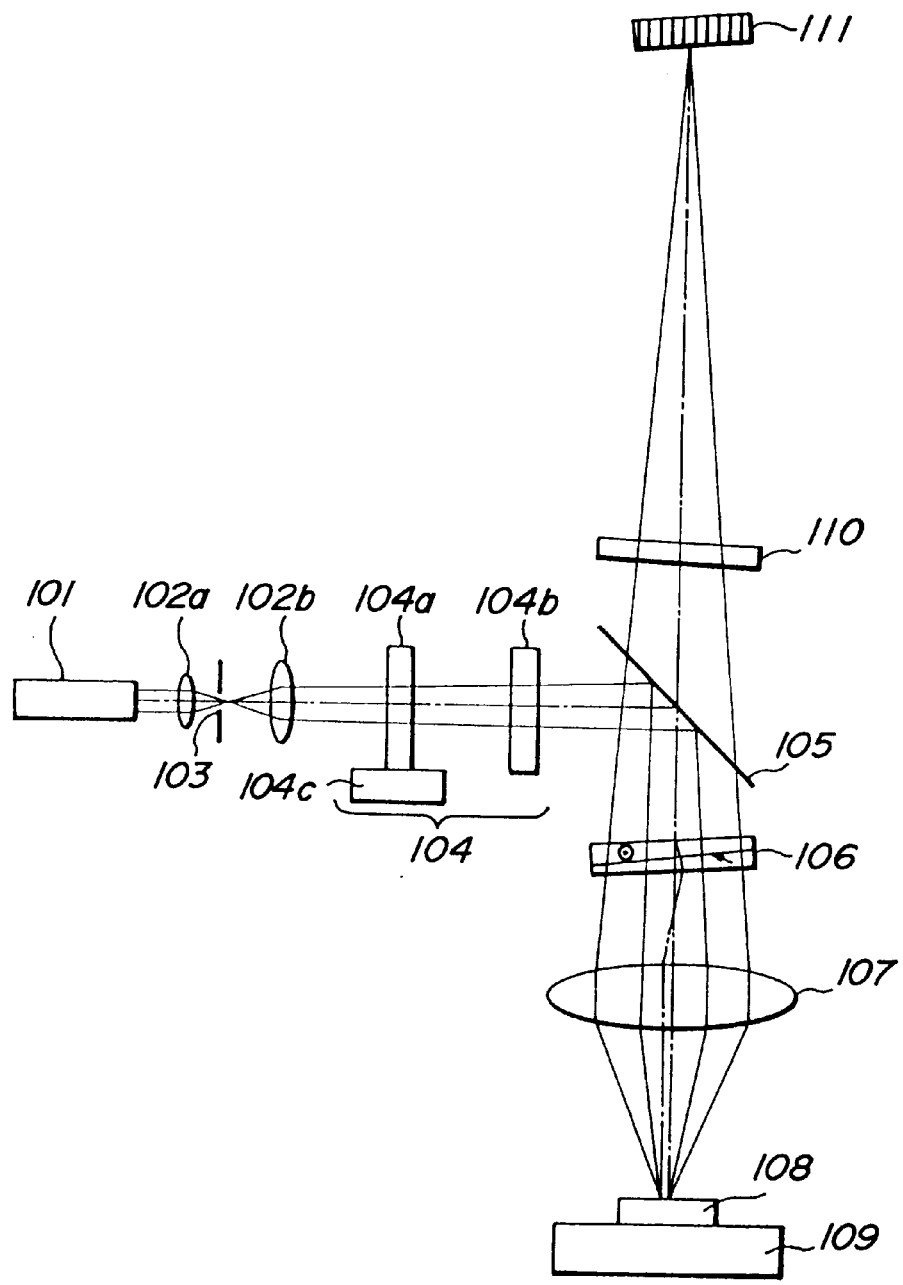
FIG_11

FOCUS ADJUSTING METHOD AND SHAPE MEASURING DEVICE AND INTERFERENCE MICROSCOPE USING SAID FOCUS ADJUSTING METHOD

BACKGROUND OF THE INVENTION

1. Field of the Invention

The present invention relates to a method of adjusting a focus of an imaging optical system which formns an image of an interference image produced by an interference optical system and containing information about a shape of an object under inspection.

The invention also relates to a shape measuring device and an interference microscope for measuring, checking and monitoring a fine object by using the focus adjusting method.

2. Related Art Statement

Various types of shape measuring devices for measuring and checking objects have been proposed. For instance, one known type device has been disclosed in D. Malacara, "Optical Shop Testing", John Wiley and Sons, New York (1978). Particularly, a phase measurement using the fringe scan has been widely used in the measurement of a fine structure of an object, because depressions and protrusions of an object surface can be measured with a precision which is higher than a hundredth of a wavelength.

C. Bouwhius et al have reported in "Principles of Optical Disc Systems", Intern. Trens in Optic, Acad. Press (1991) that when an object surface has a step, diffracted light contains a phase jump (singular point) near the step. This singular point has a very small size, and is generated not only at the step, but also in a close vicinity of a point at which an optical property of an object is discontinuous. For instance, at a boundary of two different optical materials, a singular point occurs. Therefore, by measuring a position of a singular point with high precision, the optical discontinuous point can be measured precisely.

FIG. 1 is a schematic view showing a known shape measuring device. This shape measuring device utilizes the Twyman-Green interferometer. A parallel coherent light beam emitted by a laser 1 is expanded by a beam expander 2. The expanded parallel laser beam is made incident upon an interference optical system 3 formed by a half mirror and is divided thereby into an inspection laser beam which is directed toward an object 4 under inspection along an inspection optical path 5 and a reference laser beam which is directed toward a reference body 6 along a reference optical path 7. These laser beams are reflected by the object 4 and reference body 6, respectively and are made incident again upon the interference optical system 3 along the optical paths 5 and 7, respectively. At the interference optical system 3, these laser beams are composed to produce a composite laser beam due to the interference. The composite laser beam in then made incident upon an objective lens 8 and a composite image of the object 4 and reference body 6 in formed on an image sensing device 9. An image signal obtained by the image sensing device 9 is supplied to an image display device 11 via a controller 10 and an interference image is displayed thereon.

In the interference image displayed on the image display device 11, there is produced interference fringes in accordance with a local difference in an optical path length between the inspection optical path 5 and the reference optical path 7. Therefore, during the time that the reference body 6 is moved in a direction of an optical axis by driving a phase modulator 12 from the controller 10 to vary the difference in optical path length finely, a plural number of interference images are picked-up by the image sensing device 9. Then, a phase distribution in a vicinity of a surface of the object 4 can be calculated from the interference images. Methods of calculating the phase distribution from a plural number of interference images obtained by using the fringe scan have been described in detail in Catherine Creath, "PHASE-MEASUREMENT INTERFEROMETRY TECHNIQUES", Progress in Optics XXVI, Amsterdam 1988, pp. 350–393 and JP-A 5-232304.

However, in the known shape measuring devices, there is a problem in the detection of the singular point in a vicinity of the surface of the object under inspection. That is to say, the phase distribution is very sensitive to a focus of the objective lens with respect to the object under inspection. This has been explained in D. M. Gale et al, "Linnik Microscope Imaging", Applied optics, 35 (1996), pp. 131–148. For instance, in this article, the objective lens has a numerical aperture NA=0.9 and the light beam has a wavelength $\lambda$=0.633 $\mu$m. Then, a focal depth $\Delta$ of the objective lens becomes $\Delta=\lambda/2NA^2=0.4$ $\mu$m. However, even if a focus is moved only by a very small distance such as 0.1 $\mu$m, the observed phase distribution might change greatly.

There have been also proposed various types of interference microscopes including interferometers and microscopes for measuring and checking fine objects. Particularly, there has been proposed an interference microscope for measuring a phase distribution in the vicinity of a surface of a fine object and inspecting the object by detecting a phase jump (singular point). Such an interference microscope has a higher resolution than a conventional optical microscope, and has been described in, for instance, V. P. Tychinsky, "ON SUPERRESOLUTION OF PHASE OBJECTS", Optics Communications, 74 (1989), pp. 41–45, and the above mentioned D. M. Gale et al, "Linnik Microscope Imaging", Applied Optics, 35 (1996), pp. 131–148.

FIG. 2 is a schematic view illustrating a known interference microscope of Michelson type. A mono-chromatic light beam emitted by a mono-chromatic light source 21 such as a laser is made incident upon an object 25 under inspection by means of condenser lens 22, half mirror 23 and objective lens 24. A part of the light beam is made incident upon a reference body 27 by means of an interference optical device 26 such as a half mirror provided between the objective lens 24 and the object 25. Light beams reflected by the object 25 and reference body 27 are composed by the interference optical device 26 and a composite image is formed as an enlarged image by means of the objective lens 24 and half mirror 23 on an image sensing device 28 such as a CCD. An output image signal from the image sensing device 28 is displayed on an image display device 30 by means of a controller 29.

On the image sensing device 28, interference fringes are formed in accordance with a local difference in optical path length between an inspection optical path 31 and a reference optical path 32. Therefore, as explained above with reference to FIG. 1, upon driving a phase modulator 33 to move the reference body 27 in a direction of optical axis, a plural number of interference images are taken by the image sensing device 28. Then, the phase distribution in the vicinity of the surface of the object 25 can be calculated from the interference images.

FIG. 3 shows a known interference microscope of Linnik type and FIG. 4 illustrates a known interference microscope of Mirau type. In FIGS. 3 and 4, the controller 29 and display device 30 are omitted for the sake of simplicity. In these interference microscopes, the light beam emitted by the laser 21 is focused on the pupil of the objective lens by means of two positive lenses 35a and 35b and a pin hole 36 provided therebetween, and thus the laser beam is made incident upon the object 25 as a plane wave.

The Linnik type interference microscope shown in FIG. 3 is generally used under such a condition that the Michelson type interferometer could not be provided owing to a small working distance. The half mirror constituting the interference optical device 26 is arranged above an inspection objective lens 24a, and a reference objective lens 24b is arranged in the reference optical path 32 at a position which is conjugate with a position of the inspection objective lens 24a in the inspection optical path 31. In FIG. 3, the half mirror of the interference optical device 26 also serves as the half mirror for introducing the laser beam into the objective lenses 24a and 24b, but a separate half mirror may be provided for this purpose.

In the Mirau type interference microscope depicted in FIG. 4, the laser beam emitted by the laser 21 is made incident upon the object 25 under inspection by means of positive lens 35a, pin hole 36, positive lens 35b, half mirror 37 and objective lens 24, the interference optical device 26 formed by the half mirror is arranged perpendicularly to the optical axis between the objective lens 24 and the object 25 under inspection, and the reference body 27 is arranged at a position which is conjugate with the object 25 with respect to the interference optical device 26. In this type of interference microscope, when the interference optical device 26 and reference body 27 are fixed with respect to the objective lens 24, the optical path length may be changed by varying a distance between the objective lens 24 and the object 25 under inspection for deriving the phase distribution from a plural number of interference images.

To the above mentioned interference microscopes shown in FIGS. 2–4, the above mentioned analysis for the electric field is equally applied. That is to say, the phase distribution changes abruptly in the vicinity of the singular point even if the focus of the objective lens moves over a distance which is shorter than the focal depth. Therefore, in order to measure a shape of the object on the basis of the singular point, the focus of the objective lens should be brought into the singular point, which does not always appear on the object surface.

In the known shape measuring devices as well as in the known interference microscopes, the position of the objective lens is manually adjusted such that the bright field image can be seen clearly and sharply or the position of the objective lens is automatically adjusted by means of an automatic focussing device. In either case, there always be introduced an error substantially equal to the focal depth of the objective lens. Due to this error, a measurement of the object under inspection could not always be performed at a position at which a singular point appears, and thus it is practically difficult to obtain reliable measurement results having high reproducibility and precision.

SUMMARY OF THE INVENTION

The present invention has for its object to provide a novel and useful method of adjusting a focus, by means of which a shape of an object under inspection can be measured with high reproducibility and precision.

It is another object of the invention to provide a shape measuring device which can measure a shape of an object under inspection with high reproducibility and precision by using the focus adjusting method according to the invention.

It is another object of the invention to provide an interference microscope which can measure a shape of an object under inspection with high reproducibility and precision by using the focus adjusting method according to the invention.

According to a first aspect of the invention, a method of adjusting a focus of an imaging optical system which forms an interference image produced by an interference optical system and containing information about a shape of an object under inspection onto a given image forming plane, wherein the focus of the imaging optical system with respect to the object under inspection is adjusted by using a singular point obtained from said interference image formed on said image forming plane.

According to a second aspect of the invention, a shape measuring device comprises:

an interference optical system for producing an interference image between an object under inspection and a reference body;

an imaging optical system for forming an image of said interference image on a given image forming plane;

an image sensing device arranged on said image forming plane for picking-up said image of the interference image to produce image information;

an operation processing means for receiving said image information from said image sensing means and calculating the phase distribution in a vicinity of the surface of the object under inspection from the received image information; and a focus adjusting means for adjusting a focus of the imaging optical system with respect to the object under inspection such that the position of a singular point in the phase distribution can be specified.

According to a third aspect of the invention, an interference microscope comprises a light source means for emitting coherent illumination light;

an interference optical system for forming an interference image between an object under inspection and a reference body from the illumination light;

an objective lens for forming an enlarged image of said interference image formed by said interference optical system on a predetermined image forming plane;

an image sensing device for sensing said enlarged interference image;

a phase modulating device for modulating a phase difference between an optical path from said light source means to said interference image via said object under inspection and an optical path from said light source means to the interference image via a reference body;

a phase distribution calculating means for calculating a phase distribution in a vicinity of a surface of the object under inspection from a plural number of interference images which are obtained from said image sensing device by modulating said phase difference by means of said phase modulating device; and a focus adjusting device for adjusting a focus of said objective lens with respect to the object under inspection such that a singular point of said phase distribution calculated by said phase distribution calculating means appears clearly.

In a preferable embodiment of the interference microscope according to the invention, said phase modulating device comprises a wavelength variable filter arranged between the light source means and the image sensing device.

In another preferable embodiment of the interference microscope according to the invention, said light source means comprises a light source which can emit light having a variable wavelength, and said phase modulating device is comprises a means for changing a wavelength of light emitted from said wavelength variable light source.

In the shape measuring device and interference microscope according to the invention, the shape of an object under inspection can be measured with high reproducibility and precision by adjusting the focus of the imaging optical system or objective lens with respect to the object under inspection by the focus adjusting means in such a manner that the singular point of the detected phase distribution appears clearly.

The inventor has conducted detailed and careful nalysis for an electric field in a vicinity of a surface of an object under inspection and has confirmed that a singular point does not always appear when the focus is formed on the object surface. This will be further explained in detail with reference to FIGS. 5 and 6.

FIG. 5A is a schematic cross sectional view showing a model of an object under inspection (diffraction grating) used in the electric field analysis. In this model, on a silicon oxide substrate 15 are formed silicon nitride films ($Si_3N_4$) 16 having a width of 1.5 $\mu$m and a thickness of 0.2 $\mu$m, said films being arranged side by side with a pitch of 2 $\mu$m. Then, a distance between adjacent edges of the silicon nitride films 16 becomes 0.5 pm as shown in FIG. 5A. Refractive indices n of the silicon oxide substrate 15 and silicon nitride film 16 are assumed to be 1.5 and 2, respectively. Upon the object is made incident a P-polarized plane wave having a wavelength $\lambda$ of 0.63 $\mu$m and an electric field which extends in a plane parallel with the grooves, i.e. a plane perpendicular to the plane of the drawing of FIG. 5A.

FIG. 5B shows a contour plot of the phase distribution of an apparent electric field which is produced in a vicinity of the surface of the object when the object is viewed from an objective lens having a numerical aperture NA=0.9. In this came, singular points due to the structure of the object are not produced at the object surface, but at a position $Z_0$ which descends from the surface of the substrate 15 by 0.08 $\mu$m.

FIG. 6 shows a variation of the phase distribution measured by the objective lens of NA=0.9 when a focus is shifted within a focal depth ($\pm$0.4 $\mu$m) at a pitch of 0.1 $\mu$m from the position $Z_0$ at which the singular point appears. In FIG. 6, $Z_{0+}$ denotes a position slightly above the position $Z_0$ and $Z_{0-}$ represents a position slightly below the position $Z_0$. As can be seen from FIG. 6, when the focus of the objective lens is moved from an upper position to a lower position through the position $Z_0$, a phase jump is produced at the singular point and the phase changes from +180° to −180°. This is due to the fact that the phase jump of +180° and phase jump of −180° are mathematically equivalent to each other. It should be noted that a root of the phase jump at the singular point $Z_0$ is set to 0, because the origin of the phase axis can be selected arbitrarily.

When the focus of the objective lens is formed at the point $Z_0$, a sharp jump of phase is obtained, and a direction of the phase jump becomes opposite ($\pm$180°) with respect to the singular point. A lateral position of the phase jump substantially corresponds to a lateral position of the surface step of the object, and therefore the detection of the lateral position of the surface step of the object can be performed with a very high precision with which the phase jump position is measured.

If the objective lens is focused at a point of $Z_0$−0.4 $\mu$m or a point of $Z_0$+0.4 $\mu$m, there is still an abrupt change in the phase near the singular point, but there is no phase jump. Therefore, it is difficult to determine the singular point.

As described above, in the vicinity of the singular point, the phase distribution changes greatly even within a range of the focal depth of the objective lens. Therefore, in order to measure A shape of the object on the basis of the singular point, it is desired to bring the focus of the objective lens accurately into the singular point. It should be further noted that a singular point does not always exist on the surface of the object under inspection.

Now the method of detecting a singular point used in the present invention will be explained with reference to FIGS. 5A, 5B and 6. Upon an actual measurement, the focus of the objective lens is roughly adjusted onto the object surface by monitoring the bright field image of the object. When it is assumed that the focus of the objective lens is accurately set on the object surface, the focal position separates from the position $Z_0$ upwardly by 0.28 $\mu$m. That is to say, the focal position is shifted from $Z_0$ by a sum of a distance of 0.08 $\mu$m from $Z_0$ to the surface of the $SiO_2$, substrate 15 and a thickness of the $Si_3N_4$ film 16, i.e. 0.2 $\mu$m. Therefore, an obtained phase distribution becomes similar to a curve of $Z_0$+0.3 $\mu$m in FIG. 6. It is apparent that this phase distribution is flat as a whole and does not include a sharp phase jump, and therefore a position of a singular point could not be determined clearly or accurately.

Then, it is assumed that the focus is shifted upward by 0.1 $\mu$m. In this case, an observed phase distribution becomes a curve denoted by $Z_0$+0.4 $\mu$m. Then, the phase distribution becomes much more smooth and characteristics of a singular point decreased, and thus one can understand that the focus has been moved in an incorrect direction.

Therefore, the focus is then moved downward. It is now assumed that the focus is shifted with a pitch of 0.1 $\mu$m, and at each positions of the focus, phase distributions are derived. Then, a rise of the phase distribution near the singular point becomes sharper and sharper, and at the singular point of $Z_0$, a phase jump of 180° is observed, so that the position of the singular point can be specified precisely.

The above explanation may be equally applied to a case in which the focus is shifted from a lower position than Z. Also in this case, the phase jump of 180° is observed when the focus of the objective lens is set to the position $Z_0$ of the singular point, and thus the singular point can be found precisely.

According to the invention, it is not limited to use the pitch of 0.1 $\mu$m over which the focus is shifted every time. For instance, the pitch may be varied such that when the focus is separated from a singular point by a rather long distance, a large pitch is used and when the focus comes closer to a singular point, a smaller pitch is used. Then, the singular point can be specified efficiently and accurately within a short time period.

In the above explanation, it is assumed that the phase jump of 180° is observed. In practice, the phase jump of 180° could not be always obtained due to external disturbances such as optical noise and electrical noise. Moreover, in some objects, the phase jump at the singular point is smaller than 180° and the phase in not inverted at the singular point. In such a case, the focus may be adjusted such that a maximum phase jump is obtained. Furthermore, a differential value of an inclination of the phase variation in a vicinity of a singular point is calculated and the focus may be adjusted such that the differential value becomes maximum.

According to the invention, it is also possible to compare the observed phase jump with a certain threshold value and to adjust the focus in accordance with a result of comparison. For example, when a material and a shape of an object under inspection are previously presumed, it is possible to estimate an amount of the phase jump in a vicinity of a singular point theoretically or experimentally and a suitable threshold value can be predetermined on the basis of an amount of phase jump within a practically allowable focus range. Then, the focus may be adjusted such that an amount of phase jump exceeds such a threshold value.

Further, according to the invention, the focus may be adjusted by utilizing a fact that the direction of a phase jump is inverted with respect to a singular point. In this case, at first the phase distribution is detected by using a relatively large pitch, and when it is detected that a direction of phase jump in inverted, a direction of the movement of the focus is reversed and a phase distribution is detected with a relatively small pitch. By repeating such an operation, it is possible to bring the focus into the singular point within a short time period.

When the objective lens is focused at the singular point, a phase distribution between two singular points becomes flat. Therefore, the focus may be carried out such that an absolute maximum value of a difference between successively obtained phase distributions becomes minimum.

It should be further noted that the singular point may be observed not by calculating the phase in a vicinity of the object surface from a plural number of interference images, but by observing the interference image itself. In the interference measurement, the reference body is slightly inclined to the conjugate image of the object under inspection with respect to the interference optical device such that interference fringes formed by substantially straight lines arranged substantially equidistantly are superimposed on the image of the object under inspection. In this case, when the objective lens is focused at the singular point, the interference fringes show a configuration similar to a cross section in which the phase distribution is expressed by height. For instance, in the diffraction grating model shown in FIG. 5A, the interference fringes are shown by an enlarged photograph of FIG. 7. From the photograph, it can be easily understood that the phase is changed abruptly in a vicinity of the singular point, and thus a configuration of the interference fringes is also changed abruptly. Therefore, by deriving a differential image of successively obtained interference images by using a suitable image processing technique, the position of the singular point can be accurately specified from the thus obtained differential image.

It should be noted that the above explained principal conception of the present invention may be applied not only to the Shearing type interferometer including the above mentioned Michelson type and Mirau type interferometers and the two-beam interferometer including the above explained Linnik type interferometer, but also to the single-beam interferometer using double refraction prisms such as Wollaston prism and Nomarski prisms. In other words, the present invention may be applied to any type of interferometers which produce interference images in accordance with the shape of objects under inspection.

BRIEF DESCRIPTION OF THE DRAWINGS

FIGS. 5A and 5B are schematic views explaining the electric field analysis in a vicinity of a surface of an object under inspection;

FIG. 11 is a schematic view showing a second embodiment of the interference microscope according to the invention.

DESCRIPTION OF THE PREFERRED EMBODIMENTS

Figure 1:
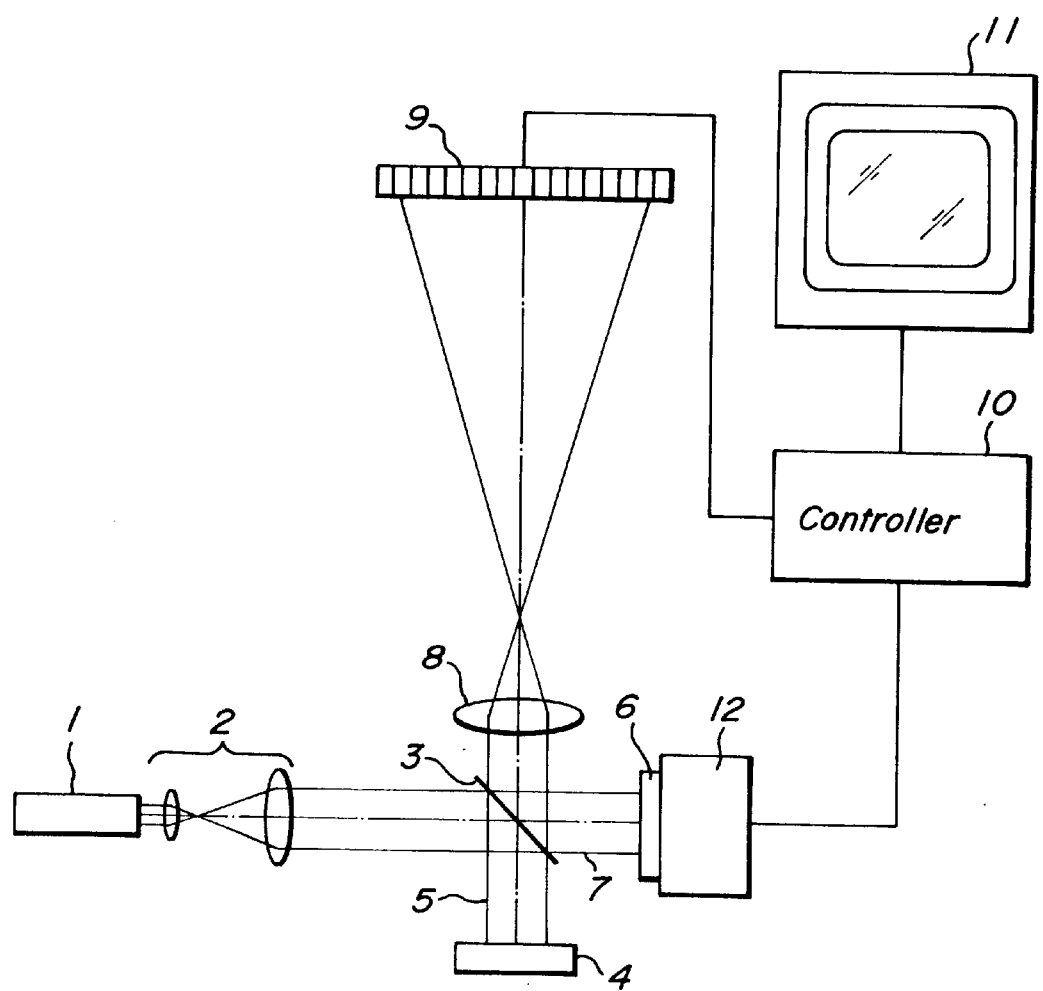
FIG. 1 is a schematic view showing a known shape measuring device.
Figure 2:
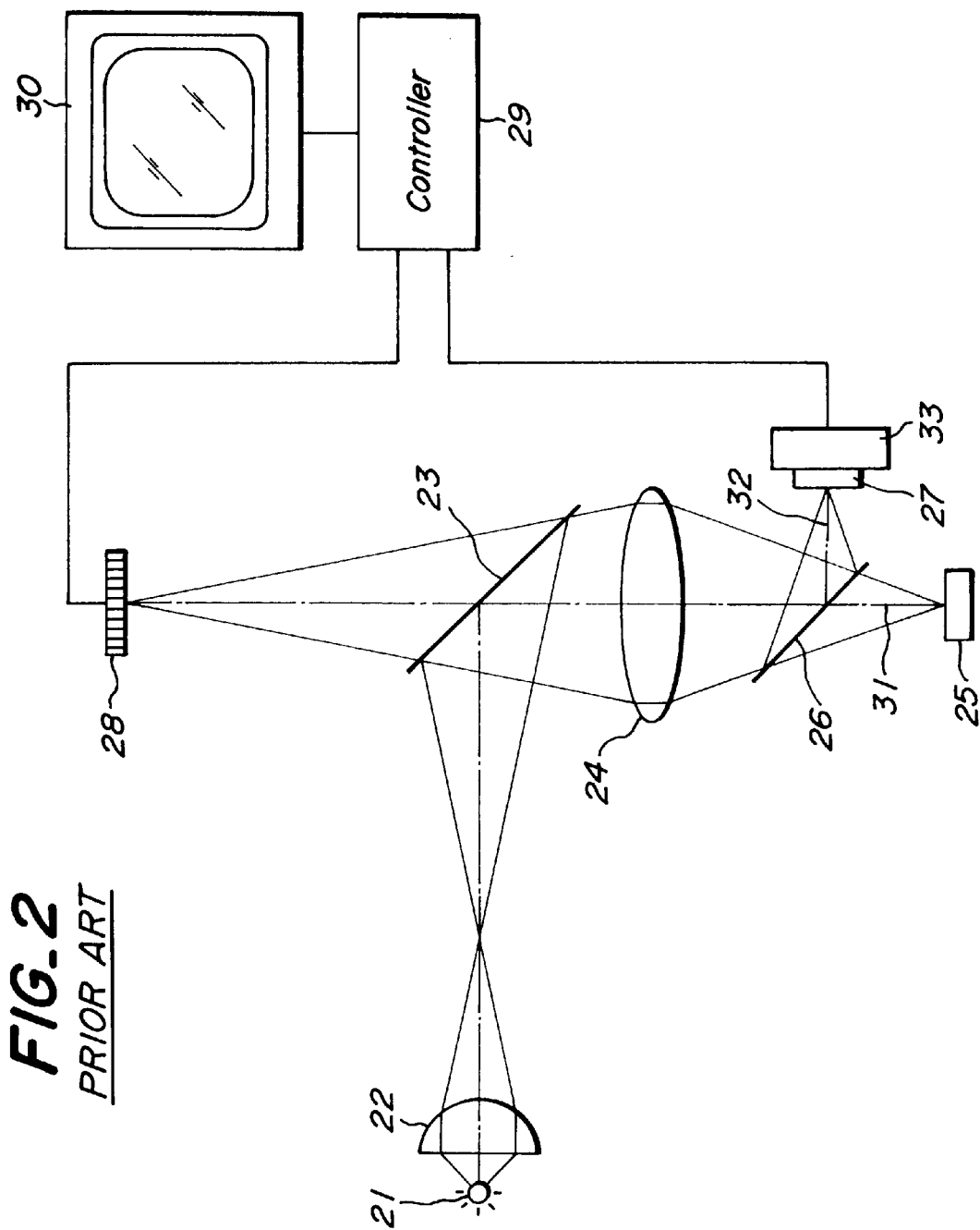
FIG. 2 is a schematic view showing a known interference microscope.
Figure 3:
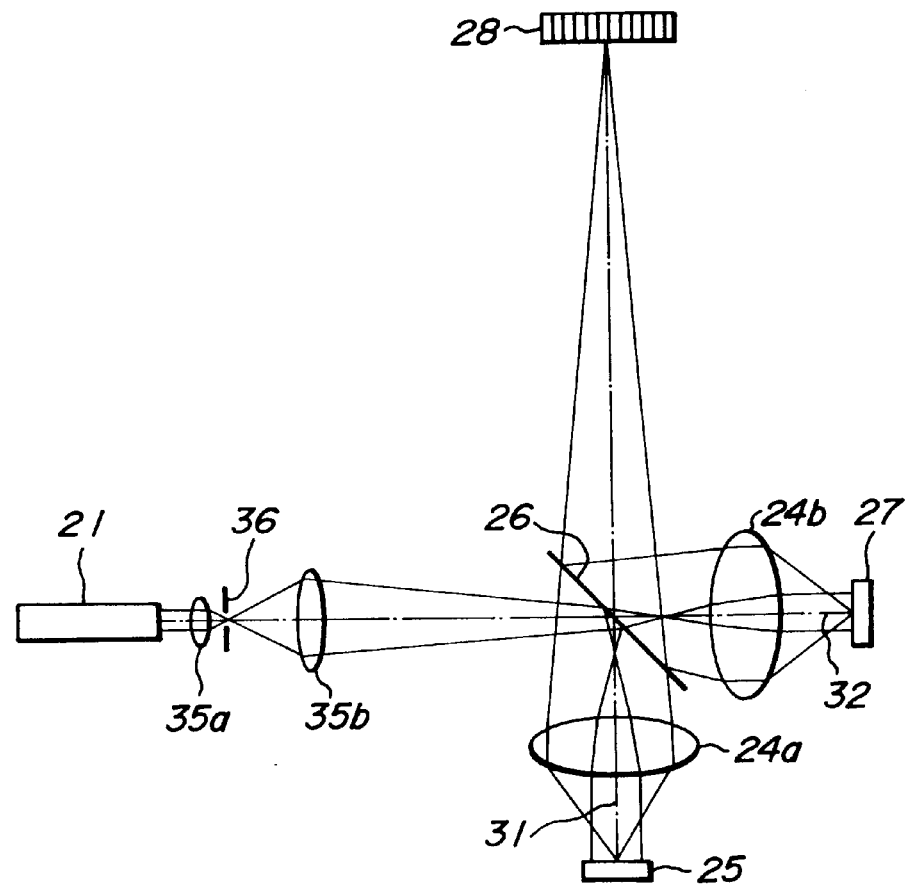
FIG. 3 is a schematic view illustrating a known interference microscope.
Figure 4:
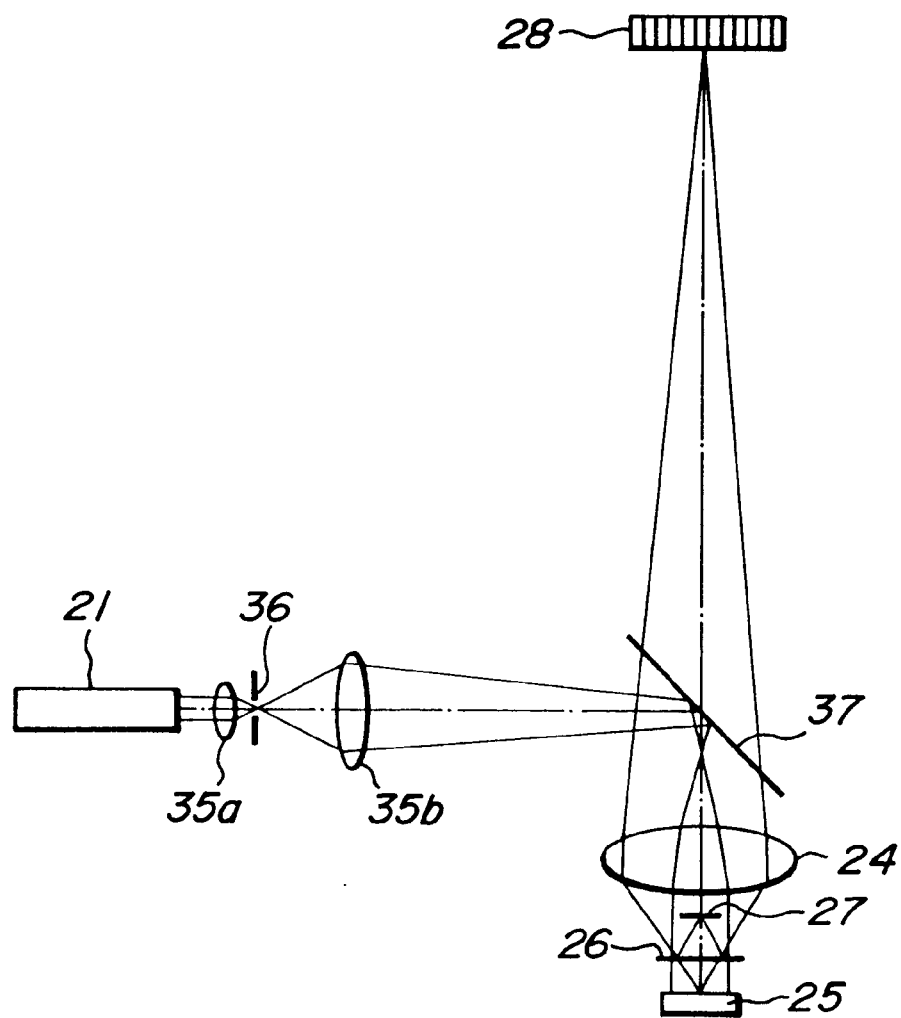
FIG. 4 is a schematic view depicting a known interference microscope.
Figure 6:
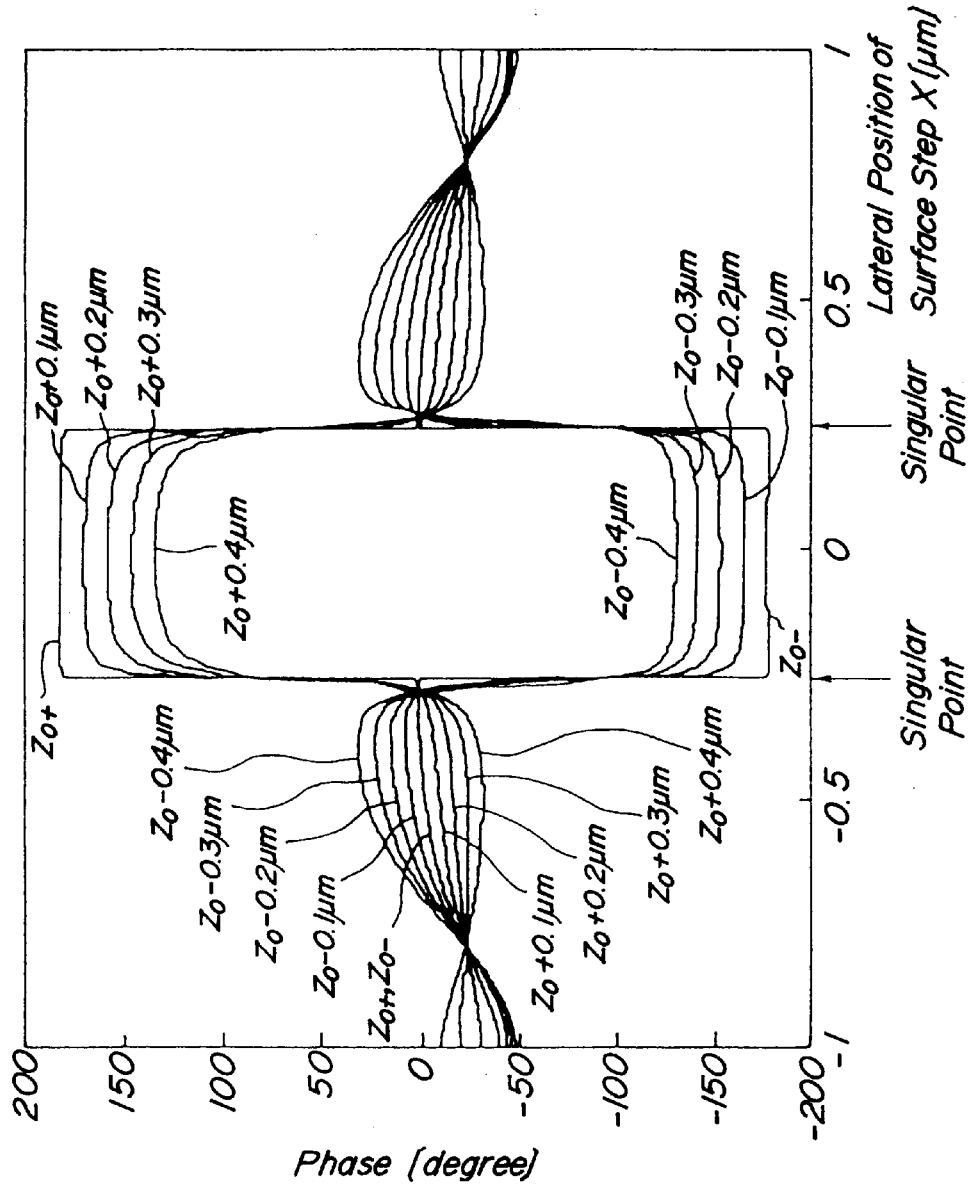
FIG. 6 is a graph representing phase distributions.
Figure 7:
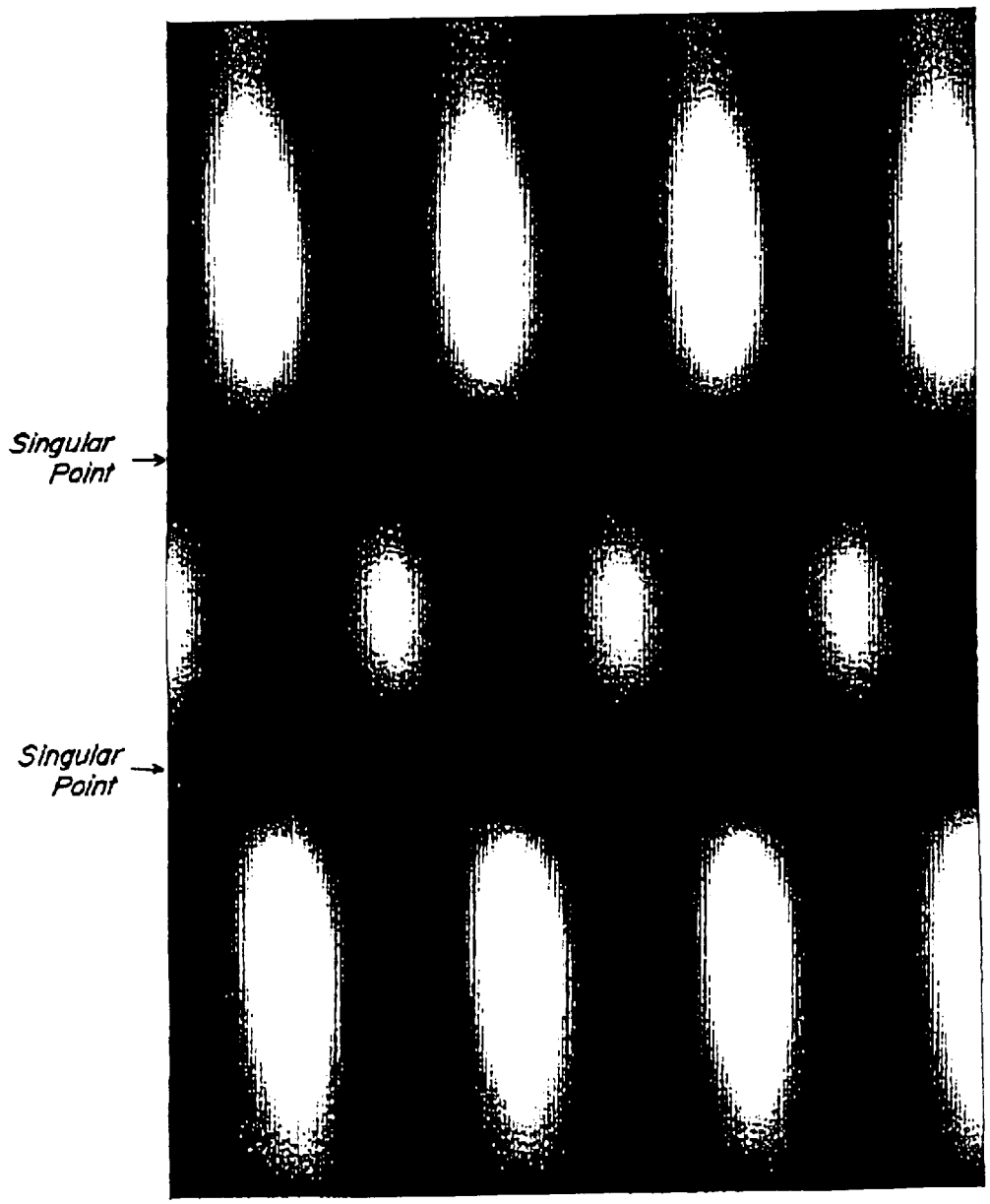
FIG. 7 is a photograph showing interference fringes obtained when the focus is set at a singular point.
Figure 8:
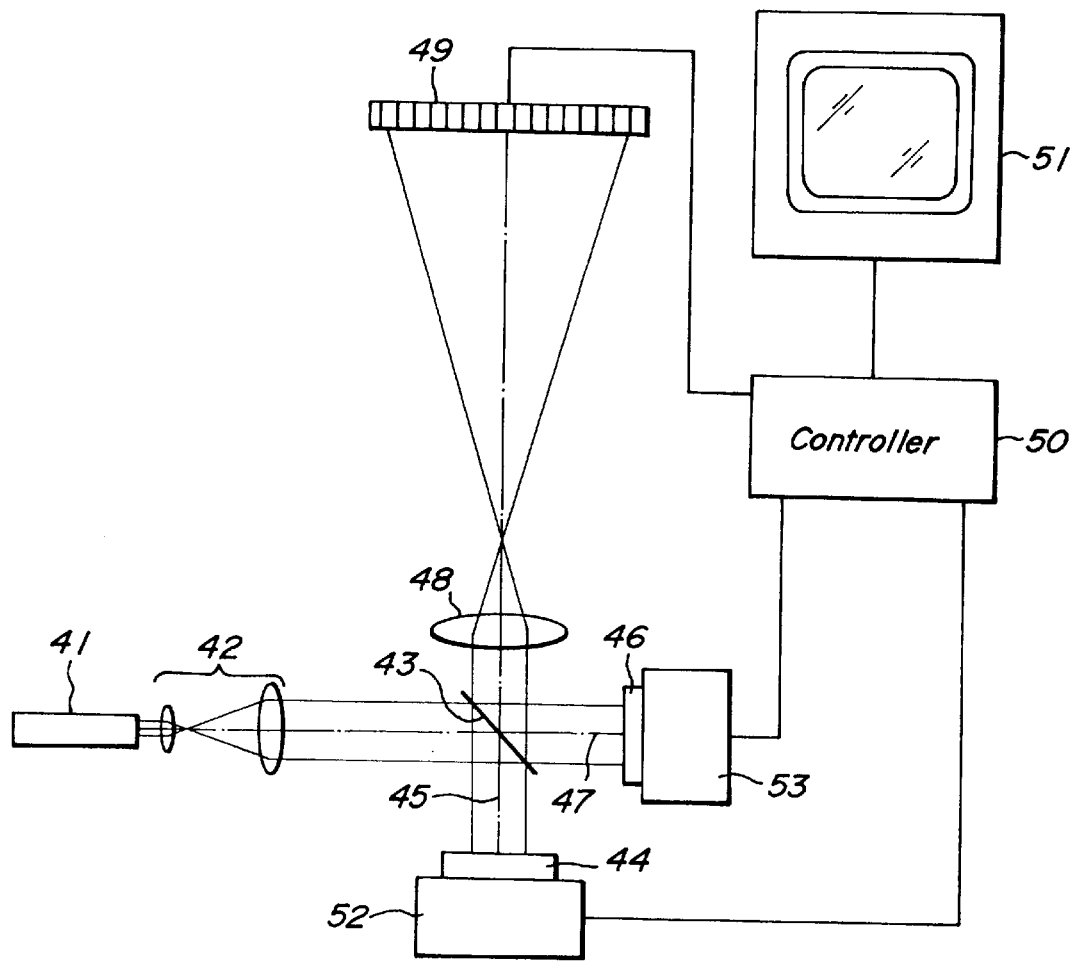
FIG. 8 is a schematic view depicting a first embodiment of the shape measuring device according to the invention.

FIG. 8 is a schematic view showing a first embodiment of the shape measuring device according to the invention. In the present embodiment, parallel coherent illumination light emitted by a laser 41 is expanded by a beam expander 42 to have a suitable diameter. The expanded parallel laser beam is made incident upon an interference optical system 43 of Twyman-Green type and is divided into an inspection laser beam which is directed toward an object 44 under inspection along an inspection optical path 45 and a reference laser beam which is directed toward a reference body 46 along a reference optical path 47. The laser beams reflected by the object 44 under inspection and reference body 46, respectively are made incident again upon the interference optical system 43 along the inspection and reference optical paths 45 and 47, respectively. At the interference optical system 43, theme laser beams are composed due to interference to produce an interference image. Then, an image of the thus composed interference image is formed on an image sensing device 49 formed by CCD by means of an objective lens 48 constituting the image forming optical system. An image signal produced by the image sensing device 49 is supplied to a controller 50.

The controller 50 processes the image signal supplied from the image sensing device 49 to generate a bright field image signal of the object 44 under inspection. The thus generated image signal is supplied to an image display device 51 to display thereon a bright field image. The controller 50 further calculates phase distributions from picked-up interference images, and thus calculated phase distributions are also displayed on the image display device 51. According to the invention, the object 44 under inspection is fixed to a focus adjusting device 52 including a piezo-electric element. The reference body 46 is also secured to a phase modulating device 53 including a piezo-electric element. The focus adjusting device 52 and phase adjusting device 53 are controlled by the controller 50.

Now an operation of inspecting the object 44 will be explained. At first, the objective lens 48 is focused on the surface of the object 44 under inspection by monitoring the bright field image of the object displayed on the image display device 51. According to the invention, this focus adjusting operation may be carried out automatically by driving the focus adjusting device 52 in accordance with the image signal supplied from the image sensing device 49 by using a known auto-focus method. Then, the phase adjusting device 53 is driven by the controller 50 such that the reference body 46 is moved in a stepwise manner along the optical axis of the reference optical path 47 by utilizing the fringe scan method such as the four bucket method. In the present embodiment, a pitch of this movement is set to a quarter wavelength. At each position during the movement of the reference body 46, four or five interference images are picked-up and the controller calculates the phase distribution at respective foci with respect to the object 44 under inspection from these interference images.

Next, the focus adjusting device 52 is driven to move the object 44 under inspection in a direction of optical axis of the inspection optical path 45. At respective positions of the object 44, phase distributions are calculated. Then, the controller 50 selects automatically, from the thus obtained two phase distributions at respective positions, a focus at which the singular point can be specified much more clearly, and then a next focus at which phase distributions have to be measured is determined on the basis of the selected focus. The above explained processes are repeated, and when a best focus at which the singular point can be most clearly specified is found, a shape of the object 44 in measured from a phase distribution obtained at this best focus.

In the embodiment shown in FIG. 8, the laser light source 41 is used, but according to the invention, it is also possible to use an incandescent lamp. Then, speckle noise specific to the laser is removed and an accurate measurement can be performed. However, in this case, it in necessary to arrange an aperture stop and mono-chromatic filter for adjusting the degree of coherence of the illumination light. A diameter of the aperture stop and a band width of the monochromatic filter may be determined in accordance with a compromise between the intensity of the interference image and the degree of coherence of the illumination light impinging upon the object 44 under inspection.

According to the invention, the phase adjusting device 53 may be formed by a frequency modulation device. When a difference in the optical path length between the inspection optical path 45 and the reference optical path 47 is fixed physically, the above mentioned function of the phase adjusting device 53 may be attained by changing the wavelength of the light, because the phase difference is changed in inverse proportion to the wavelength of light. The frequency modulating device may be formed by a wavelength variable filter arranged between the laser light source 41 and the image sensing device 49. The laser light source 41 may be formed by a semiconductor laser which can emit laser light having a variable wavelength. Then, the frequency adjusting device may be formed by a means for controlling the semiconductor laser.

Figure 9:
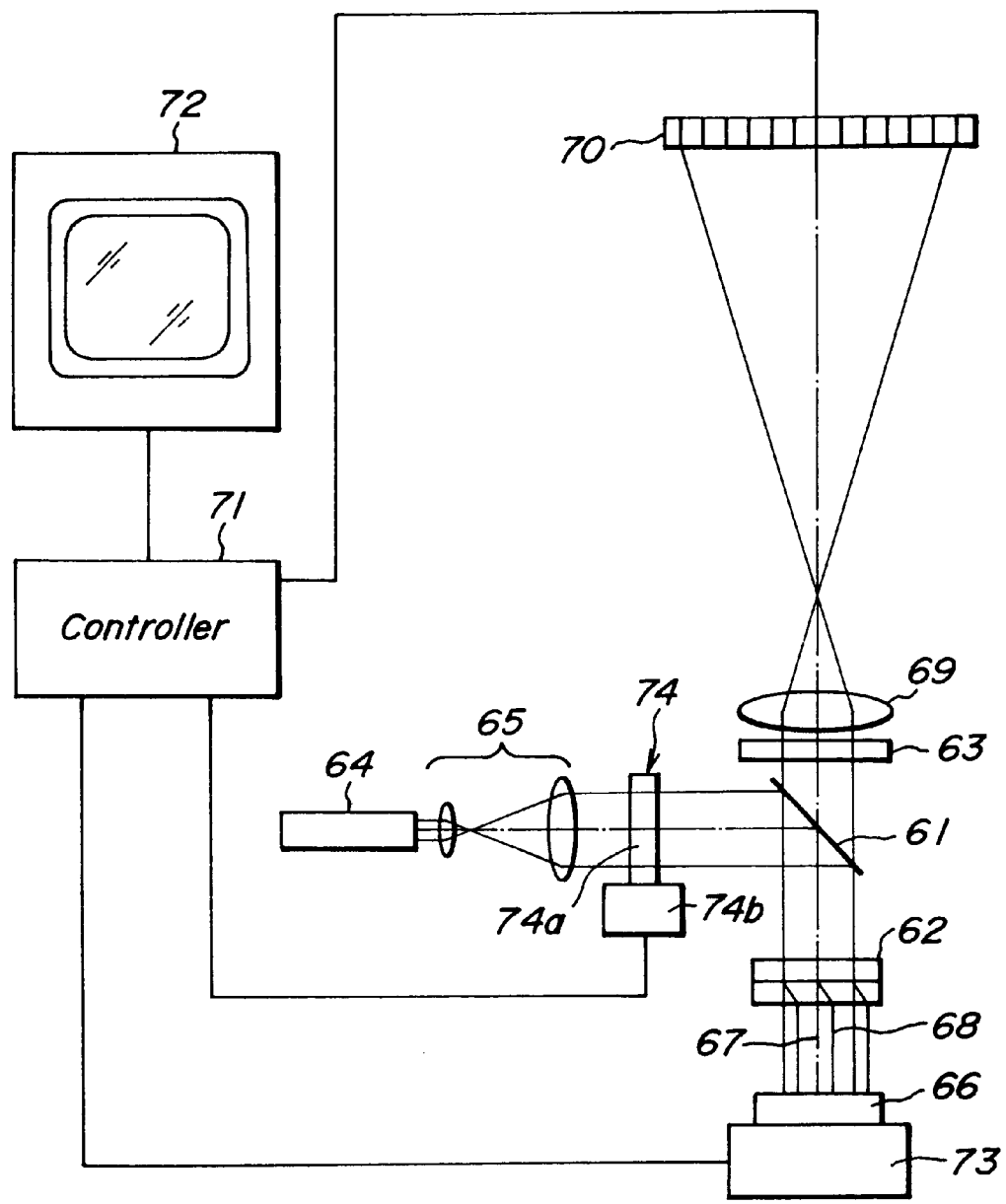
FIG. 9 is a schematic view showing a second embodiment of the shape measuring device according to the invention.

FIG. 9 is a schematic view showing a second embodiment of the shape measuring device according to the invention. The shape measuring device of this embodiment utilizes the single-beam interferometer including a half mirror 61, a Savart's plate 62 and an analyzer 63. Coherent parallel illumination laser light emitted from a laser 64 is expanded by a beam expander 65 to have a suitable diameter. The expanded laser beam is made incident upon the half mirror 61. Laser beam reflected by the half mirror 61 is made incident upon an object 66 under inspection by means of the Svart's plate 62. The Savart's plate 62 divides the incident laser beam into two orthogonally polarized components which are inherent to the Savart's plate. One of these two components is shifted laterally by a shear amount. One of the components is directed to the object 66 along an inspection optical path 67 and the other component is also directed to the object 66 along a reference optical path 68. Then, the object 66 serves as a reference body which is shifted equivalently in lateral direction by the shear amount of the Savart's plate 62.

The mutually orthogonally polarized components reflected by the object 66 under inspection are composed into a single beam by means of the Savart's plate 62, and the thus composed beam is made incident upon the half mirror 61. The laser beam transmitted through the half mirror 61 is made incident upon the analyzer 63. The orthogonally polarized beams reflected by the object 66 and impinging upon the Savart's plate 62 are not interfered with each other, but when these beams are transmitted through the analyzer 63, the polarized components are adjusted such that they are interfered with each other to form an interference image. The thus formed interference image is projected by an objective lens 69 constituting the image forming optical system onto an image plane at which an image sensing device 70 comprising CCD is arranged. An image signal generated by the image sensing device 70 is supplied to a controller 71.

In the controller 71, the image signal in processed to derive a bright field image signal of the object 66 and calculates a phase distribution from a plural number of interference images. The bright field image and phase distribution are displayed on an image display device 72 like as in the first embodiment. Also in the present embodiment, the object 66 under inspection is fixed on a focus adjusting device 73 including a piezo-electric element. By driving the focus adjusting device 73 by the controller 71, the object 66 under inspection can be moved in the direction of the optical axis of the objective lens 69.

In order to adjust a phase difference between the polarized beam propagating along the inspection optical path 67 and the polarized beam along the reference optical path 68, a phase adjusting device 74 is arranged in an optical path between the laser light source 64 and the analyzer 63. In the present embodiment, the phase adjusting device 74 is provided between the beam expander 65 and the half mirror 61. The phase adjusting device 74 comprises a polarization compensating plate 74a and its driving device 74b. The driving device 74b is controlled from the controller 71 to rotate the polarization compensating plate 74a about the optical axis.

In the present embodiment, at first the objective lens 69 is focused onto a surface of the object 66 under inspection by monitoring a bright field image displayed on the image display device 72. Then, the phase adjusting device 74 is driven by the controller 71 to modulate a phase difference between the orthogonally polarized beams. During this phase modulation, a plural number of interference images are picked-up by the image sensing device 70. The controller 71 calculates a phase distribution from these interference images at a current focus.

After that, the focus adjusting device 73 is driven by the controller 71 to move slightly the object 66 under inspection in the direction of the optical axis. At a current focus, a phase distribution is once again calculated by the controller 71. In the present embodiment, the thus calculated phase distribution is compared with the last phase distribution to derive a difference therebetween. From result of the comparison, a focus at which the singular point is much more apparent is selected automatically to derive a next focus at which a phase distribution is to be detected next. The process mentioned above is repeated until an optimal focus at which the singular point can be specified most clearly is found. Then, a shape of the object 66 under inspection is measured in accordance with a phase distribution which is obtained at said optimal focus.

In the present embodiment, since the object 66 under inspection is also used as the reference body, it is possible to obtain the interference fringes having a very high contrast. Moreover, the inspection optical path 67 and reference optical path 68 are substantially common, the measurement could be hardly affected by an vibration of the object 66 with respect to the interferometer. Further, since the phase difference between the polarized beam propagating along the inspection optical path 67 and the polarized beam along the reference light path 68 is adjusted by the polarization compensating plate 74a, the phase difference can be controlled precisely and stably. Therefore, the shape of the object 66 under inspection can be measured with much higher reproducibility and precision.

Figure 10:
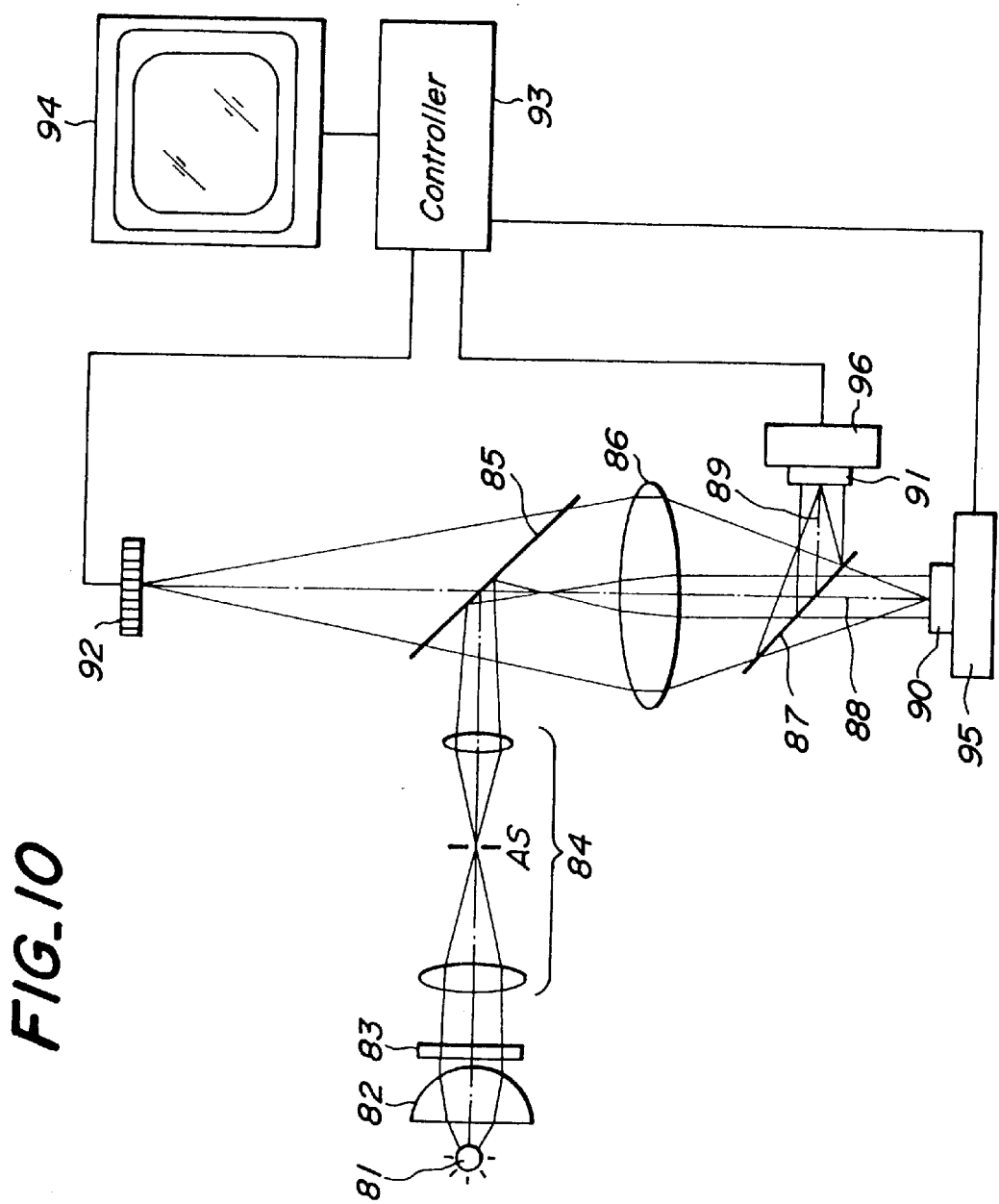
FIG. 10 is a schematic view illustrating a first embodiment of the interference microscope according to the invention.

FIG. 10 is a schematic view illustrating a first embodiment of the interference microscope according to the invention. Light emitted by an incandescent lamp 81 is converted into a parallel light beam by a condenser lens 82 and is then made incident upon a mono-chromatic filter 83 to produce coherent illumination light. The illumination light is then converged at a pupil of an objective lens 86 by means of an illumination optical system 84 including an aperture stop AS and a half mirror 85. Then, the illumination light is divided by a Michelson type interferometer 87 including a half mirror into an inspection light beam propagating along an inspection optical path 88 and a reference light beam along a reference light path 89. These light beams are made incident upon an object 90 under inspection and a reference body 91 in the Köhler's illumination. It should be noted that the incandescent lamp 81, condenser lens 82 and mono-chromatic filter 83 constitute the light source means for emitting the coherent illumination light.

The light beams reflected by the object 90 under inspection and the reference body 91 are made incident again upon the interference device 87 along the inspection optical path 88 and reference optical path 89 and are composed thereby to produce a composite interference image. The thus formed interference image is projected by the objective lens 86 and half mirror 85 onto an image sensing device 92 arranged at a focus of the objective lens 86 as an enlarged interference image. The image sensing device 92 may be formed by a CCD. An image signal produced by the image sensing device 92 is supplied to a controller 93.

In the controller 93, the image signal is processed to derive a bright field image signal of the object 90 and calculates a phase distribution from a plural number of interfrence images. These bright field image and phase distribution are displayed on an image display device 94. The object 66 under inspection is fixed on a focus adjusting device 95 including a piezo-electric element. By driving the focus adjusting device 95 by the controller 93, the object 90 under inspection can be moved in the direction of the optical axis of the objective lens 86. The reference body 91 is fixed to a phase adjusting device 96 having a piezo-electric element. By driving the phase adjusting device 96, the reference body 91 is moved in the direction of the optical axis of the reference optical path 89. The phase adjusting device 96 is also controlled by the controller 93.

A band width of the mono-chromatic filter 83 and a diameter of the aperture stop AS provided in the illumination optical system 84 are determined such that the intensity of the interference image and the degree of coherence of the light on the object 90 are compromised with each other. A size of a pixel of the image sensing device 92 is set to a tenth or a hundredth of an Airy's disk of the objective lens 86.

In the present embodiment, at first the objective lens 89 is focused onto a surface of the object 90 under inspection by monitoring a bright field image displayed on the image display device 94. It should be noted that the focus control may be carried out automatically by driving the focus adjusting device 95 in accordance with an automatic focus control signal obtained by processing the image signal supplied from the image sensing device 92. Then, the phase adjusting device 96 is driven by the controller 93 in accordance with the fringe scan such a 4 bucket method to move the reference body 91 in the direction of optical axis at a pitch of a quarter wavelength. During this phase modulation, a plural number of interference images are picked-up by the image sensing device 92. The controller 93 calculates a phase distribution from these interference images at a current focus.

After that, the focus adjusting device 95 is driven by the controller 93 to move slightly the object 90 under inspection in the direction of the optical axis. At a current focus, a phase distribution is once again calculated by the controller 93. In the controller 93, the thus obtained two phase distributions are compared with each other and one of the phase distributions in which characteristics of the singular point appear much more clearly is selected. Then, a next focus at which a phase distribution is to be detected is determined. The process mentioned above is repeated until an optimal focus at which the singular point can be specified most clearly is found. Then, a shape of the object 90 under inspection is measured in accordance with a phase distribution which is obtained at said optimal focus.

In the present embodiment, the incandescent light source 81 is used, but according to the invention, a laser light source may be also utilized. However, the incandescent light source is preferable, because it is free from speckle noise. Furthermore, the phase modulating means may be formed by a frequency modulating means which modulates a frequency of light to be used. For this purpose, a wavelength variable filter may be arranged between the light source 81 and the image sensing device 92. Then, the phase modulating means may be simplified. When the light source is formed by a semiconductor laser, the phase modulating means may be formed by means for controlling the semiconductor laser such that a wavelength of emitted laser is adjustable.

FIG. 11 is a schematic view illustrating a second embodiment of the interference microscope according to the invention. In this interference microscope, use is made of a Nomarski type differential interferometer. Coherent parallel laser beam emitted from a laser light source 101 is made incident upon a Nomarski prism 106 by means of positive lens 102a, pin hole 103, positive lens 102b, phase adjusting device 104 and half mirror 105. The laser beam impinging upon the Nomarski prism 106 is divided thereby into orthogonally polarized two beams. These laser beams are then made incident upon an object 108 by means of an objective lens 107 as parallel beams which are separated from each other by a distance substantially equal to a resolution of the objective lens. The object 108 under inspection is fixed onto a focus adjusting device 109 comprising a piezoelectric element.

The two laser beams reflected by the object 108 under inspection are made incident upon the Nomarski prism 106 by means of the objective lens 107. Then, the two beams are composed into a single beam. Therefore, in the present embodiment, the object 108 under inspection also serves as the reference body which is shifted with respect to the object by a distance substantially equal to the resolution of the objective lens 107. The two mutually orthogonally polarized beams composed by the Nomarski prism 106 are made incident upon an analyzer 110 via the half mirror 105. At the analyzer 110, only components having a given direction are interfered with each other. Then, an interference image is formed on an image sensing device 111 which is arranged at a focus of the objective lens 107. In the present embodiment, in order to avoid undesired flare, the Nomarski prism 106, analyzer 110 and image sensing device 111 are inclined with respect to the optical axis.

The phase adjusting device 104 is formed by a Senarmont compensator having a half wavelength plate 104a, a quarter wavelength plate 104b and a stepping motor 104c for rotating the half wavelength plate 104a about the optical axis. By rotating the half wavelength plate 104a, it is possible to adjust a ratio in intensity of light and a phase difference between the two orthogoanlly polarized laser beams divided by the Nomarski prism 106. Axis of the quarter wavelength plate 104b and analyzer 110 are inclined by ±45° with respect to the polarizing direction of the two beams separated by the Nomarski prism 106, so that intensities of light of theme two polarized beams become identical with each other. In this manner, by rotating the half wavelength plate 104a by the stepping motor 104c, the phase difference between the two orthogonally polarized beams separated by the Nomarski prism can be changed at a rate which is larger than a rotational angle of the half wavelength plate by four times.

The stepping motor 104c and the focus adjusting device 109 are controlled by the controller not shown in this embodiment. The image signal generated by the image sensing device 111 picking-up the interference images is supplied to the controller to display the bright field image and the phase distribution derived from the interference images on an image display device.

Also in the present embodiment, like as the first embodiment shown in FIG. 10, at first the objective lens 107 is focused onto a surface of the object 109 under inspection by monitoring a bright field image displayed on the image display device. Then, the phase adjusting device 104 is driven to modulate a phase difference between the two orthogonally polarized beams. During this phase modulation, a plural number of interference images are picked-up by the image sensing device 111 and a phase distribution is calculated from these interference images at a current focus.

After that, the focus adjusting device 109 is driven to move slightly the object 109 under inspection in the direction of the optical axis. At a current focus, a phase distribution is once again calculated, and the thus calculated two phase distributions are compared with each other. One of the phase distributions in which characteristics of the singular point appear much more clearly is automatically selected and a next focus at which a phase distribution is to be detected is determined. The process mentioned above is repeated until the optimal focus at which the singular point can be specified most clearly is found. Then, the shape of the object 109 under inspection is measured in accordance with a phase distribution which is obtained at said optimal focus.

In the present embodiment, since the reference body is constituted by the object 109 under inspection, it is possible to obtain the interference fringe having a very high contrast, and since the inspection optical path is common to the reference optical path, the measurement is hardly affected by a vibration of the object 109 with respect to the microscope. Moreover, the phase difference between the two orthogonally polarized beams can be controlled accurately by rotating the half wavelength plate 104a. Therefore, the shape of the object 109 under inspection can be measured in a much more reproductive and precise manner.

In the present embodiment, the laser beam emitted by the laser 101 is confined by the pin hole 103, and thus the laser beam can be focused on the object 109 under inspection as a Gaussian beam having a size which is substantially equal to an object area whose phase is to be measured. Therefore, the a wave plane at the focus becomes flat and a plane wave illumination can be attained microscopically, and thus an illumination area can be confined upon compared with a simple Köhler's illumination. In this manner, it is possible to realize an efficient illumination.

In the present embodiment, the light source is formed by the laser 101, but it may be constructed by an incandescent lamp like as the previous embodiment. In this case, the half wavelength plate 104a of the phase modulating device 104 is replaced by a polarizer. Therefore, in this case, the phase difference is changed by twice of a rotating angle of the polarizer.

It should be further noted that the phase modulating device is not limited to the Senarmont compensator, but may be formed by an electro-optical element by means of which the phase difference can be adjusted by the controller. Further, the Nomarski prism 106 constituting the differential interferometer may be moved in a direction perpendicular to the optical axis to control the phase difference.

What is claimed is:

1. A method of adjusting a focus of an imaging optical system which forms an interference image produced by an interference optical system and containing information about a shape of an object under inspection onto a given image forming plane, wherein the focus of the imaging optical system with respect to the object under inspection is adjusted by using a phase singular point detected in said interference image formed on said image forming plane.

2. A shape measuring device comprising:
    an interference optical system for producing an interference image between an object under inspection and a reference body;
    an imaging optical system for forming an image of said interference image on an image forming plane;
    an image sensing device arranged on said image forming plane for picking-up said image of the interference image to produce image information;
    an operation processing device for receiving said image information from said image sensing device and calculating a phase distribution of the object under inspection from the received image information; and
    a focus adjusting device for adjusting a focus of the imaging optical system with respect to the object under inspection to a focus at which a phase position of a singular point is detected in the phase distribution.

3. A shape measuring device according to claim 2, wherein said focus adjusting device includes at least two focus adjusting mechanisms, one of which performs the focus adjustment by using the phase singular point measured from said interference images.

4. A shape measuring device according to claim 2, wherein said phase singular point is detected by measuring a phase distribution on said object under inspection.

5. A shape measuring device according to claim 4, wherein said focus adjusting device performs the focus adjustment such that a phase jump at the phase singular point becomes larger.

6. A shape measuring device according to claim 4, wherein said focus adjusting device performs the focus adjustment such that said phase jump at the phase singular point exceeds a predetermined threshold value.

7. A shape measuring device according to claim 4, wherein said focus adjusting device adjusts the focus to a vicinity of a point at which a polarity of a phase jump at said phase singular point is inverted.

8. A shape measuring device according to claim 4, wherein said focus adjusting device performs the focus adjustment such that a phase distribution becomes flat between two phase singular points.

9. A shape measuring device according to claim 4, wherein said focus adjusting device performs the focus adjustment such that a maximum value of an absolute value of a differentiated phase distribution becomes smaller.

10. A shape measuring device according to claim 2, wherein said phase singular point is detected from a differential value of said interference images.

11. A shape measuring device according to claim 10, wherein said focus adjusting device performs the focus adjustment such that said differential value of the interference images at said phase singular point becomes larger.

12. A shape measuring device according to claim 10, wherein said focus adjusting device performs the focus adjustment such that said differential value of the interference images exceeds a predetermined threshold value.

13. A shape adjusting device according to claim 10, wherein said focus adjusting device adjusts the focus to a vicinity of a point at which a polarity of said differential value of the interference images at said phase singular point is inverted.

14. An interference microscope comprising:

a light source device for emitting coherent illumination light;

an interference optical system for forming an interference image between an object under inspection and a reference body from the illumination light;

an objective lens for forming an enlarged image of said interference image formed by said interference optical system on a predetermined image forming plane;

an image sensing device for sensing said enlarged interference image;

a phase modulating device for modulating a phase difference between an optical path from said light source device to said interference image via said object under inspection and an optical path from said light source device to the interference image via a reference body;

a phase distribution calculating device for calculating a phase distribution of the object under inspection in a vicinity of a surface of the object under inspection from a plural number of interference images which are obtained from said image sensing device by modulating said phase difference by using said phase modulating device; and a focus adjusting device for adjusting a focus of said objective lens with respect to the object under inspection to a focus at which a phase singular point is detected in said phase distribution calculated by said phase distribution calculating device.

15. An interference microscope according to claim 14, wherein said phase modulating device comprises a wavelength variable filter arranged between the light source device and the image sensing device.

16. A interference microscope according to claim 14, wherein said light source device can emit light having a variable wavelength, and said phase modulating device changes a wavelength of light emitted from said wavelength variable light source.

* * * * *

UNITED STATES PATENT AND TRADEMARK OFFICE
CERTIFICATE OF CORRECTION

PATENT NO. : 5,956,141
DATED : September 21, 1999
INVENTOR(S) : Shinichi Hayashi It is certified that error appears in the above-indentified patent and that said Letters Patent is hereby corrected as shown below:

On the title page, item

[30]  Foreign Appln. Priority Data
         Sept. 13, 1996 [JP] Japan 8-263806
         Sept. 17, 1996 [JP] Japan 8-244724

Signed and Sealed this

Tenth Day of April, 2001

Attest:

NICHOLAS P. GODICI

*Attesting Officer*      *Acting Director of the United States Patent and Trademark Office*